J. TYLL.
GARBAGE DRAINER FOR SINKS.
APPLICATION FILED APR. 4, 1908.
914,090.
Patented Mar. 2, 1909.
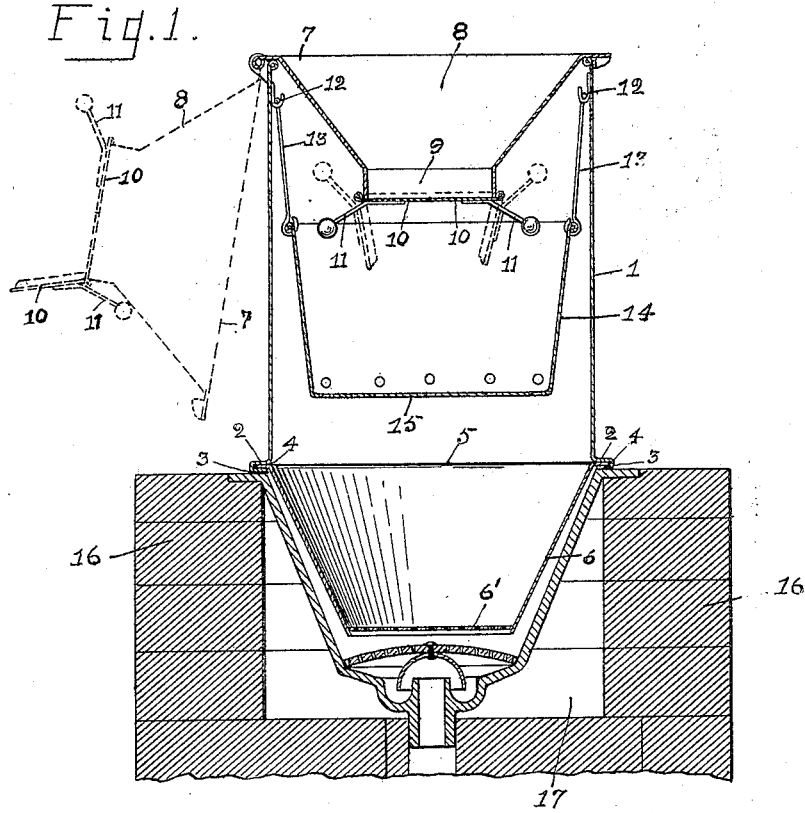
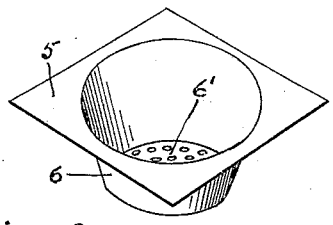
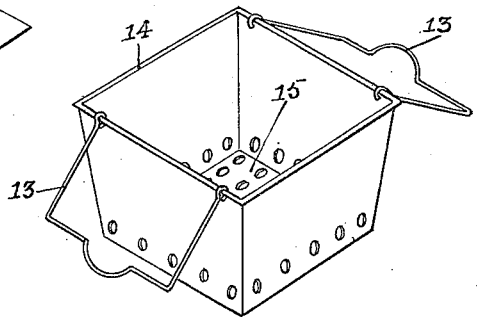
WITNESSES:
D. C. Walter
M. A. Young.
INVENTOR.
James Tyll
by Robt B Watson
his Attorney

UNITED STATES PATENT OFFICE.

JAMES TYLL, OF TOLEDO, OHIO.

GARBAGE-DRAINER FOR SINKS.

No. 914,090.   Specification of Letters Patent.   Patented March 2, 1909.

Application filed April 4, 1908. Serial No. 425,115.

*To all whom it may concern:*

Be it known that I, JAMES TYLL, a subject of the Emperor of Austria-Hungary, Province of Bohemia, residing at Toledo, in the county of Lucas and State of Ohio, have invented a new and useful Improvement in Garbage-Drainers for Sinks, of which the following is a specification.

My invention relates to a garbage drainer for sinks and has for its object to provide a simple and convenient and sanitary receptacle of the kind that is adapted to be mounted over catch basins or kitchen sinks, as a receptacle for kitchen garbage or the like, and that is adapted to receive kitchen slops and refuse of all kinds, drain the fluids from the solids and retain the solids in a detachable vessel convenient for carrying them away and depositing them in a receptacle for the garbage alone.

A further object is to provide a receptacle of the kind, that is automatically opened by depositing either solids or fluids, separate or mixed, therein, and that is automatically closed as soon as the materials deposited have passed within, whereby they are hidden from view while the fluids are being drained therefrom, and do not attract flies and the like.

I accomplish these objects by the construction and combination of parts as hereinafter described and illustrated in the drawings, in which—

Figure 1 is a vertical section of a garbage drainer constructed in accordance with my invention and mounted over and partly in a catch basin and showing in dotted lines the hinged top closure hopper opened in position for the removal of the detachable drainer vessel. Fig. 2 is a perspective view of the bottom portion of the drainer body detached, and Fig. 3 is a perspective view of the drainer vessel detached from the body of the receptacle.

In the drawings 1 designates a sheet metal casing which is preferably rectangular. Opposite sides of the casing are provided respectively with outwardly projecting bottom flanges 2, portions 3 of which are folded inward to form slide grooves 4 to receive a bottom 5, formed of a sheet of metal, and having its center portion press drawn to form a conically recessed portion 6, having a bottom 6'.

To the top end of the casing, there is hinged to one side thereof a closure 7, having a central hopper shaped portion 8 extending downward into the casing a distance below its top.

To opposite sides of the inner opening 9 of the hopper 8, are hinged the trap doors 10, which are adapted to meet central of the opening 9 and form a bottom closure for the hopper. To the bottom side of each door is secured a weighted arm 11 which projects outward from the hinged edge of the door. The arms 11 are of a weight, adapted, when the top closure 7 is resting on top of the casing 1, to normally close the doors 10 of the opening 9.

Within the casing 1, near the top of opposite sides of the casing are provided the hooks 12, upon which is suspended by the side bails 13, the draining bucket or pan 14, preferably four sided and tapered inward toward the perforated bottom 15. The casing 1, thus constructed and equipped, is mounted on the walls 16 of a catch basin 17, and is supported thereon by the flanges 2, and is preferably of dimensions to form a closure for the wall of the basin. Thus mounted, when garbage of any and all kinds is emptied into the hopper 8, the trap doors 10 open under the weight of the garbage and permit it to drop into the drainage bucket 14, the trap doors 10 automatically closing again as soon as it has passed the doors, whereby the garbage is hidden from view, and flies and other insects are not attracted thereto.

The perforated bottom 15 allows the fluids to be drained from the solids, and when thoroughly drained the top closure 7 is turned over on its hinges as shown in dotted lines in Fig. 1, and the bucket 14 is lifted by the bails 13 from the casing 1, emptied into a receptacle for the solid portions of the garbage, and replaced in the casing.

By the construction shown and described I have provided a convenient and sanitary garbage drainer that is adapted to be mounted over a sink or catch basin, and to receive and automatically conceal from view garbage of all kinds deposited therein, and drain the liquid from the solid portions into the sewer without clogging the sewer connection of the sink.

While I have shown my invention as applied to a yard catch basin it is manifest that in a reduced size and suitably supported, my drainer is adapted for use in connection with a kitchen sink.

What I claim to be new is—

1. In a garbage drainer, the combination of a casing, a detachable closure for the top of the casing, said closure forming a hopper extending inward of the casing, and said hopper being provided with a pair of counter-weighted trap doors forming a bottom closure for the hopper, said doors being adapted to be held normally closed by the counterweights, and to be automatically opened downward and from each other by material thrown into the hopper, supporting hooks extending inward and oppositely from the walls of the casing, above the level of the bottom of the hopper, and a detachable drainer vessel adapted to be suspended on the hooks within the casing below the trap doors.

2. A garbage drainer for sinks and the like comprising a rectangular casing body having base flanges formed to receive a bottom at one end, and suspending hooks within the casing, a bottom adapted to be detachably secured to the flanges of the casing and having a central portion conically recessed and perforated, a detachable drainer pan adapted to be suspended within the casing on the hooks, and a closure hinged to the top end of the casing, the closure being provided with a hopper having counter-weighted trap doors adapted to form a bottom for the hopper and to be held normally closed by the counterweights, and to be opened by material thrown into the hopper.

In witness whereof, I have hereunto signed my name in the presence of two subscribing witnesses, this 24th day of March, 1908.

JAMES TYLL.

In presence of—
  WM. J. FRITSCHE,
  WM. CIZEK.